US010776249B2

(12) United States Patent
Duale et al.

(10) Patent No.: US 10,776,249 B2
(45) Date of Patent: Sep. 15, 2020

(54) FLEXIBLE AND IN-LINE REGISTER COMPARISON FOR BUG ANALYSIS

(71) Applicant: International Business Machines Corporation, Armonk, NY (US)

(72) Inventors: Ali Y. Duale, Poughkeepsie, NY (US); Dennis Wittig, Poughkeepsie, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 168 days.

(21) Appl. No.: 16/028,799

(22) Filed: Jul. 6, 2018

(65) Prior Publication Data

US 2020/0012586 A1 Jan. 9, 2020

(51) Int. Cl.
*G06F 11/00* (2006.01)
*G06F 11/36* (2006.01)
*G06F 9/30* (2018.01)

(52) U.S. Cl.
CPC ...... *G06F 11/3644* (2013.01); *G06F 9/30101* (2013.01); *G06F 11/3648* (2013.01)

(58) Field of Classification Search
CPC combination set(s) only.
See application file for complete search history.

(56) References Cited

U.S. PATENT DOCUMENTS

| 6,021,272 | A  | * | 2/2000  | Cahill ...................... G06F 8/52 717/147 |
| 6,311,311 | B1 |   | 10/2001 | Swayne et al. |
| 8,799,713 | B2 |   | 8/2014  | Gangasani et al. |
| 9,836,354 | B1 |   | 12/2017 | Potlapally et al. |
| 2011/0197097 | A1 | * | 8/2011 | Beaty ...................... H04L 41/16 714/27 |
| 2015/0052406 | A1 | * | 2/2015 | Garrett ................ G06F 11/1448 714/45 |

FOREIGN PATENT DOCUMENTS

CN 103365775 A 10/2013

OTHER PUBLICATIONS

Anonymous, "Method for Verifying Intermediate Results of a Randomly Generated Testcase of Processor Functional Validation Exerciser", IP.com, IPCOM000243758D, Oct. 16, 2015, 10 pages.

* cited by examiner

*Primary Examiner* — Charles Ehne
(74) *Attorney, Agent, or Firm* — Cantor Colburn LLP; Teddi Maranzano

(57) ABSTRACT

A validation and testing method is provided. The validation and testing method is executable by a processor coupled to a memory. The validation and testing method includes inserting intermediary save points within an instruction stream. The method includes executing the instruction stream including the intermediary save points. The method includes executing a save operation for data in one or more registers at each of the one or more intermediary save points.

18 Claims, 4 Drawing Sheets

| | |
|---|---|
| Condition X: | M=Buffer for actual register values: M1,M2,....Mn |
| Condition Y: | N=Buffer for expected register values |
| Condition Z: | Start with M=N |
| | |
| Line 1. | A=5*D; |
| Line 2. | A=A*B; |
| Line 3. | M1=A,B,C,D,E       (store registers) |
| Line 4. | Compare M and N; force error if no match – Catch the bug |
| Line 5. | D=A+C; |
| Line 6. | A=A-E; |
| Line 7. | M2=A,B,C,D,E       (save registers) |
| Line 8. | Compare M and N; force error if no match |
| Line 9. | C=A/5; → mismatch detected on C |

FLEXIBLE AND IN-LINE REGISTER COMPARISON FOR BUG ANALYSIS

BACKGROUND

The disclosure relates generally to flexible and in-line register comparison for bug analysis.

In general, microprocessors have become extremely complicated. In turn, contemporary validation and testing methods for these microprocessors have increased in complexity. Unfortunately, as complexity increases, the contemporary validation and testing methods lose speed, lose reliability, and include more errors.

For instance, a contemporary validation and testing method is to generate and provide an instruction set for a test case to a machine. Any error or failure in processing the instruction set is not observed until the machine provides an output. Unfortunately, the output is only generated when the machine encounters an interrupt. Thus, errors or failures that occur with respect to earlier instructions can be masked by the processing of a later instruction. In this way, as the number of instructions in the instruction set increases (e.g., as the testing method increases in complexity), the probability of errors or failures being masked increases (e.g., reliability is lost).

SUMMARY

According to one or more embodiments, a validation and testing method is provided. The method includes inserting, by a processor coupled to a memory, one or more intermediary save points within an instruction stream. The method includes executing, by the processor, the instruction stream including the one or more intermediary save points. The method includes executing, by the processor, a save operation for data in one or more registers at each of the one or more intermediary save points.

According to one or more embodiments, the method can also be implemented as a computer program product and/or a system.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

FIG. 4 depicts an example operation of a system in accordance with one or more embodiments.

DETAILED DESCRIPTION

In view of the above, embodiments disclosed herein may include a system, method, and/or computer program product (herein a system) that provides a fast, reliable validation and testing mechanism. More particularly, the validation and testing mechanism generates instruction streams with respect to test cases to execute a flexible and in-line register comparison for bug analysis.

In accordance with one or more embodiments, the validation and testing mechanism cuts out part of the instructions stream and inserts selected instructions that provide intermediate results, e.g., by outputting, saving, and testing the intermediate results in-line with the full instruction stream. The selected instructions can be automatically defined by the system and/or user defined (e.g., chosen from an instruction set). The selected instructions can be inserted after every time a certain number of instructions are executed or based on the complexity of an individual instruction itself. In the latter case, for instance, the validation and testing mechanism can ignore instructions that have a higher probability of working (e.g., simple instructions) and execute a compare for instructions that have a lower probability of working (e.g., complex instructions).

Technical effects and benefits of the validation and testing mechanism include reducing a complexity of error analysis, saving error analysis time, and catching errors as early as possible for all types of processors. Thus, embodiments described herein are necessarily rooted in the processors and memories of the system executing the validation and testing mechanism to perform proactive operations to overcome problems specifically arising with contemporary validation and testing methods (e.g., these problems include lose speed, lose reliability, and include more errors).

Figure 1:
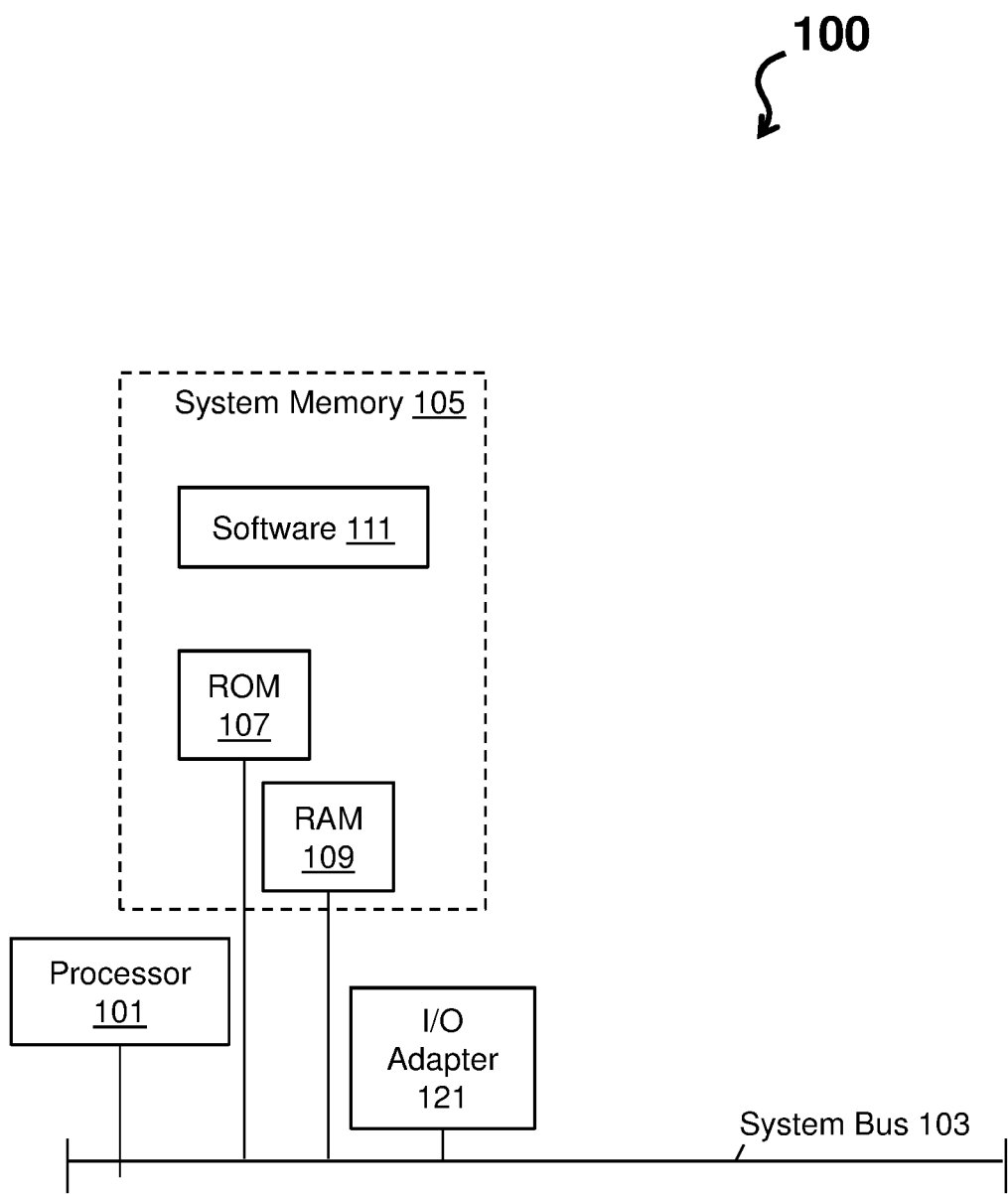
FIG. 1 depicts a system in accordance with one or more embodiments.

Turning now to FIG. 1, a computing system 100 is generally shown in accordance with an embodiment. The computing system 100 can be an electronic, computer framework comprising and/or employing any number and combination of the computing device and networks utilizing various communication technologies, as described herein. The computing system 100 can be easily scalable, extensible, and modular, with the ability to change to different services or reconfigure some features independently of others.

The computing system 100 comprises one or more central processing units (CPU(s)) (collectively or generically referred to as a processor 101). The processor 101 is coupled via a system bus 103 to a system memory 105 and various other components. The system memory 105 can include a read only memory (ROM) 107 and a random access memory (RAM) 109. The ROM 107 is coupled to the system bus and may include a basic input/output system (BIOS), which controls certain basic functions of the computing system 100. The RAM 109 is read-write memory coupled to the system bus for use by the processor 101. Software 111 for execution on the computing system 100, such as the validation and testing mechanism described herein, may be stored in the system memory 105. The system memory 105 is an example of a tangible storage medium readable by the processor 101, where the software 111 is stored as instructions for execution by the processor 101 to cause the system 100 to operate, such as is described herein with reference to FIGS. 2-3. Examples of computer program product and the execution of such instruction is discussed herein in more detail.

The computing system 100 comprises an input/output (I/O) adapter 121 coupled to the system bus 103. The I/O adapter 121 may be a small computer system interface (SCSI) adapter that communicates with the system memory 105 and/or any other similar component. The I/O adapter 121 can interconnect the system bus with a network, which may be an outside network, enabling the computing system 100 to communicate with other such systems.

Figure 2:
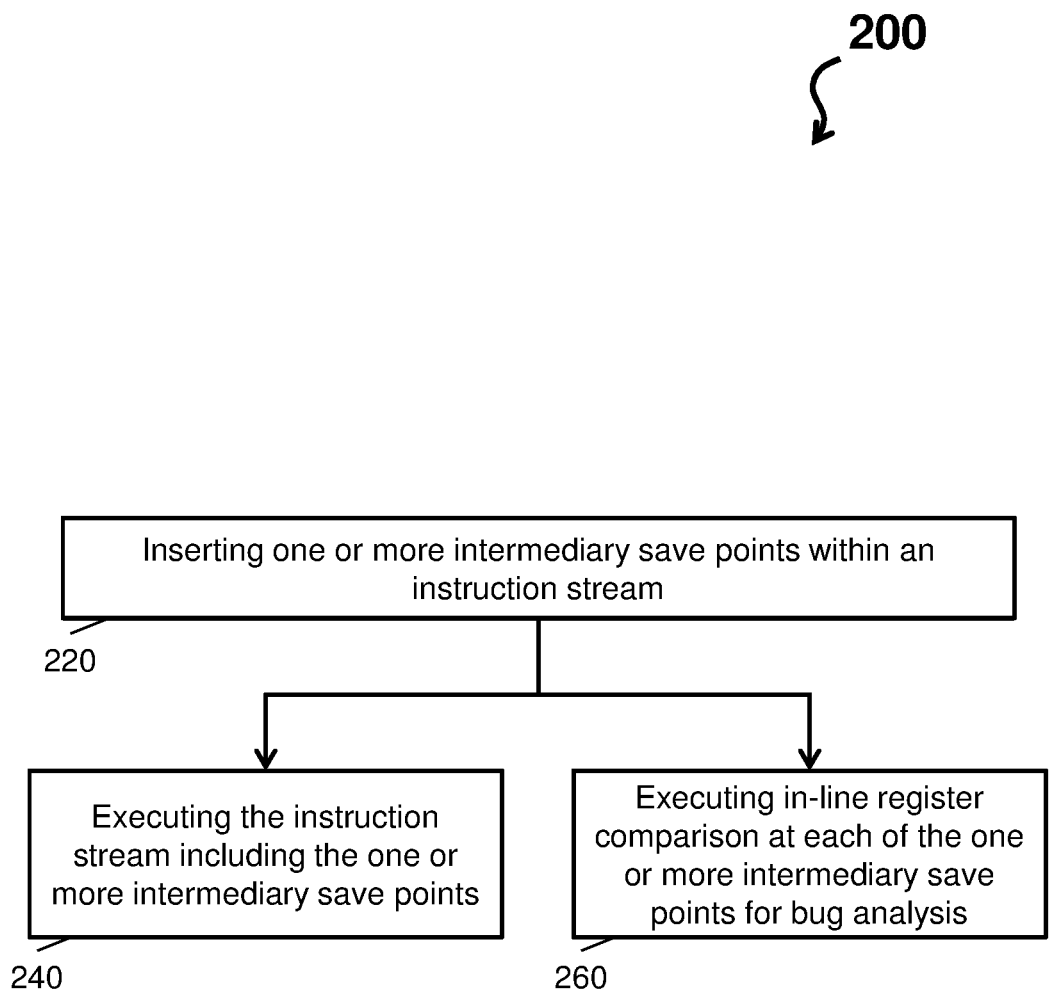
FIG. 2 depicts a process flow of a system in accordance with one or more embodiments.

Turning now to FIG. 2, a process flow 200 of the computing system 100 is depicted according to one or more embodiments. The process flow 200 is an example of a validation and testing mechanism. The process flow 200 begins at block 220, where the computing system 100 inserts one or more intermediary save points within an instruction stream.

In accordance with one or more embodiments, the one or more intermediary save points are cut out portions of the instructions stream with selected instructions inserted therein. The selected instructions cause the computing system 100 to output, save, and/or test intermediate results with respect to one or more registers in-line with the full instruction stream. Examples of the one or more registers include, but are not limited to, single and/or multiple registers such as general purpose registers, access registers, floating point registers, etc.

In accordance with one or more embodiments, the selected instructions can be inserted in a pseudo-random and/or user controlled manner. For instance, the selected instructions can be inserted after every time a certain number of instructions are executed (e.g., inserting one of the one or more intermediary save points after a predefined number of instructions are executed). Also, the selected instructions can be inserted based on the complexity of an individual instruction. In this regard, the computing system 100 may ignore instructions that have a higher probability of working (e.g., simple instructions) and executes a compare for instructions that have a lower probability of working (e.g., complex instructions).

Next, the process flow 200 proceeds to both block 240 and 260, as these operations are executed simultaneously. At block 240, the computing system 100 executes the instruction stream including the one or more intermediary save points. At block 240, the computing system 100 executes in-line register comparison at each of the one or more intermediary save points for bug analysis. In accordance with one or more embodiments, a user can choose which type of registers to watch and compare or whether all types of registers are saved/compared.

Figure 3:
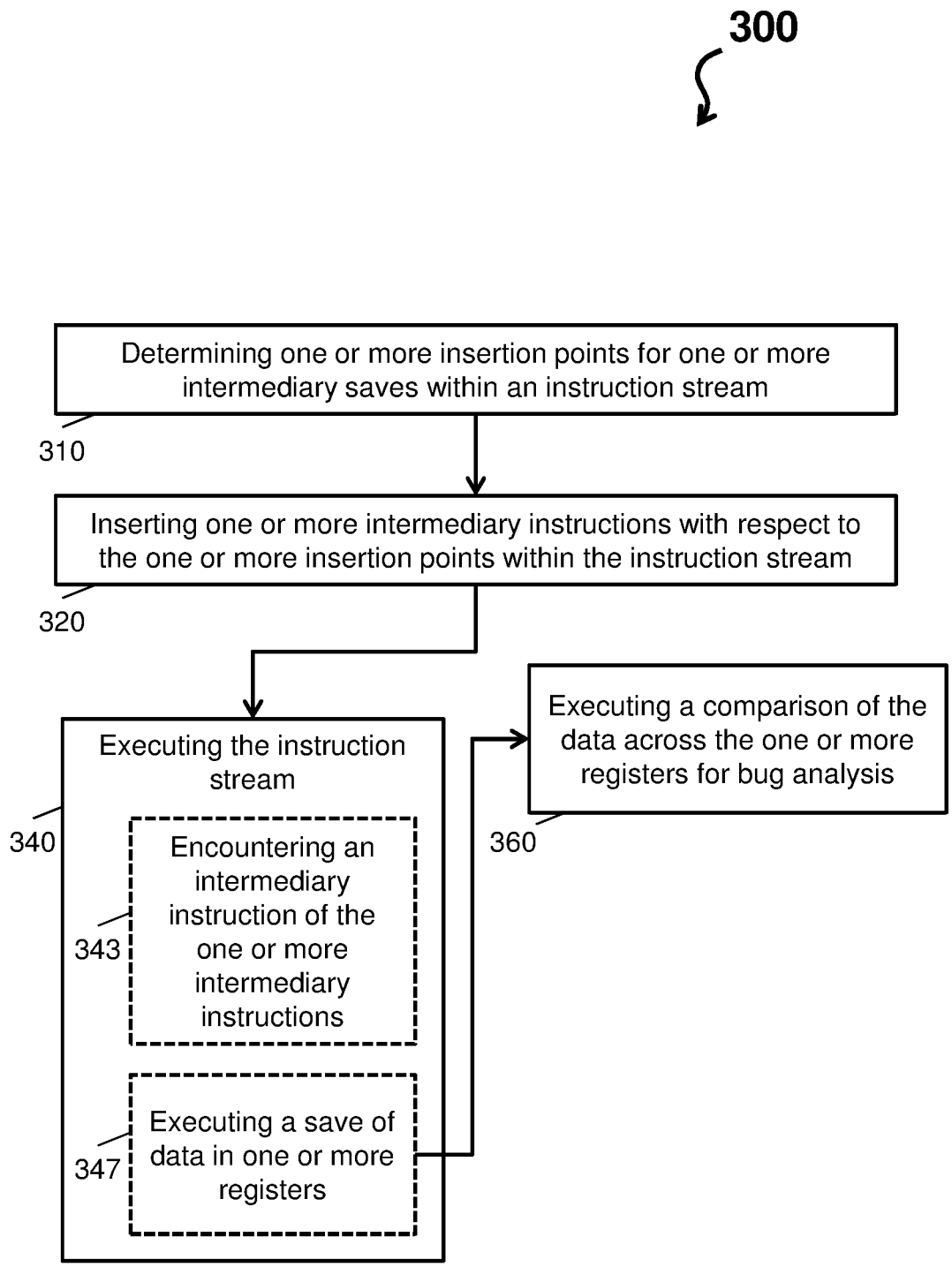
FIG. 3 depicts a process flow of a system in accordance with one or more embodiments.

Turning now to FIG. 3, a process flow 300 of the computing system 100 is depicted according to one or more embodiments. The process flow 300 is an example of a validation and testing mechanism. The process flow 300 begins at block 310, where the computing system 100 determines one or more insertion points for one or more intermediary saves within an instruction stream.

At block 320, the computing system 100 inserts one or more intermediary instructions with respect to the one or more insertion points within the instruction stream.

At block 340, the computing system 100 executes the instruction stream. As the computing system 100 executes the instruction stream, the computing system 100 performs additional operations as identified by dashed-blocks 343 and 347.

At block 343, the computing system 100 encounters an intermediary instruction of the one or more intermediary instructions. Then, at block 347, the computing system 100 executes a save of data in one or more registers.

At block 360, whether in-line with the instruction stream or independent thereof, the computing system 100 executes a comparison of the data across the one or more registers for bug analysis.

FIG. 4 depicts an example operation of a system in accordance with one or more embodiments. The example operation includes a plurality of condition, such as condition X (e.g., M=Buffer for actual register values: M1, M2 . . . Mn), condition Y (e.g., N=Buffer for expected register values), and condition Z (e.g., Start with M=N), which are set prior to initiating the instruction stream.

Further, the example operation includes mathematical instructions in Lines 1, 2, 5, and 6, store/save instructions in Line 3 and 7, and compare instructions in Lines 4 and 8. Line 9 is a detection of an error in response to the compare of Line 8. Note that the store/save instructions inserted after every two mathematical instructions.

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A validation and testing method comprising:
inserting, by a processor coupled to a memory, one or more intermediary save points based on a complexity of an individual instruction within an instruction stream;
executing, by the processor, the instruction stream including the one or more intermediary save points; and
executing, by the processor, a save operation for data in one or more registers at each of the one or more intermediary save points.

2. The validation and testing method of claim 1, wherein the inserting the one or more intermediary save points comprises:
inserting one of the one or more intermediary save points after a predefined number of instructions are executed.

3. The validation and testing method of claim 1, wherein the inserting the one or more intermediary save points comprises:
ignoring individual instruction within the instruction stream comprising a higher probability of working.

4. The validation and testing method of claim 1, wherein the inserting the one or more intermediary save points comprises:
ignoring individual instruction within the instruction stream comprising a lower probability of working.

5. The validation and testing method of claim 1, wherein the validation and testing method comprises:
executing an in-line register comparison at each of the one or more intermediary save points for bug analysis.

6. The validation and testing method of claim 1, wherein the one or more intermediary save points are cut out portions of the instructions stream with selected instructions inserted therein,
wherein the selected instructions cause an outputting, a saving, or a testing of intermediate results with respect to the one or more registers.

7. A computer program product, the computer program product comprising a computer readable storage medium having program instructions for implementing a validation and testing mechanism embodied therewith, the program instructions executable by a processor coupled to a memory to cause:

inserting, by the processor, one or more intermediary save points based on a complexity of an individual instruction within an instruction stream;

executing, by the processor, the instruction stream including the one or more intermediary save points; and executing, by the processor, a save operation for data in one or more registers at each of the one or more intermediary save points.

8. The computer program product of claim 7, wherein the inserting the one or more intermediary save points comprises:

inserting one of the one or more intermediary save points after a predefined number of instructions are executed.

9. The computer program product of claim 7, wherein the inserting the one or more intermediary save points comprises:

ignoring individual instruction within the instruction stream comprising a higher probability of working.

10. The computer program product of claim 7, wherein the inserting the one or more intermediary save points comprises:

ignoring individual instruction within the instruction stream comprising a lower probability of working.

11. The computer program product of claim 7, wherein the validation and testing method comprises:

executing an in-line register comparison at each of the one or more intermediary save points for bug analysis.

12. The computer program product of claim 7, wherein the one or more intermediary save points are cut out portions of the instructions stream with selected instructions inserted therein, herein the selected instructions cause an outputting, a saving, or a testing of intermediate results with respect to the one or more registers.

13. A system, comprising a processor and a memory storing program instructions for implementing a validation and testing mechanism thereon, the program instructions executable by the processor to cause the system to perform:

inserting, by the processor, one or more intermediary save points based on a complexity of an individual instruction within an instruction stream;

executing, by the processor, the instruction stream including the one or more intermediary save points; and executing, by the processor, a save operation for data in one or more registers at each of the one or more intermediary save points.

14. The system of claim 13, wherein the inserting the one or more intermediary save points comprises:

inserting one of the one or more intermediary save points after a predefined number of instructions are executed.

15. The system of claim 13, wherein the inserting the one or more intermediary save points comprises:

ignoring individual instruction within the instruction stream comprising a higher probability of working.

16. The system of claim 13, wherein the inserting the one or more intermediary save points comprises:

ignoring individual instruction within the instruction stream comprising a lower probability of working.

17. The system of claim 13, wherein the validation and testing method comprises:

executing an in-line register comparison at each of the one or more intermediary save points for bug analysis.

18. The system of claim 13, wherein the one or more intermediary save points are cut out portions of the instructions stream with selected instructions inserted therein, wherein the selected instructions cause an outputting, a saving, or a testing of intermediate results with respect to the one or more registers.

* * * * *